INVENTOR
HENRY H. ALBRO

BY W. E. Sherwood

ATTORNEY

July 28, 1970   H. H. ALBRO   3,521,858
VALVE HAVING FILAMENT WOUND BODY
Filed May 29, 1968   4 Sheets-Sheet 4

INVENTOR
HENRY H. ALBRO

BY  W. E. Sherwood

ATTORNEY

United States Patent Office 3,521,858
Patented July 28, 1970

3,521,858
VALVE HAVING FILAMENT WOUND BODY
Henry H. Albro, Louisville, Ky., assignor to Cabot Corporation, Boston, Mass., a corporation of Delaware
Filed May 29, 1968, Ser. No. 733,041
Int. Cl. F16k 27/06, 5/06
U.S. Cl. 251—315         5 Claims

ABSTRACT OF THE DISCLOSURE

A valve having its movable valve member and the seals therefor encased in a valve body formed of a non-molded mass of cured resin-impregnated filaments and reinforced in the normally stressed portions of the valve body. A method for producing the valve employs inexpensive mandrels for making valves of different sizes by means of a conventional filament winding apparatus and without requiring valve body enclosing molds.

BACKGROUND OF THE INVENTION

This invention relates to the art of manufacturing valves of the type wherein the movable valve member, which may be a generally spherical ball with a flow passage therethrough, is positioned with respect to its seal or seals and thereafter has the valve body formed about such valve member and seal. Conventionally, the forming of such a valve body requires the use of expensive molds to define the outer surface of the valve body and into which a moldable material, such as plastic, is injected to fill the mold space. Moreover, the bursting strength of such a valve body is dependent essentially upon the tensile strength of the moldable material and the thickness of the valve body wall.

As contrasted with this conventional procedure, such as exemplified by Breher Pat. No. 3,271,845, the present invention dispenses with such valve body molds and permits the building of the valve body by layers of high tensile strength filaments which are wound in place by relative adjustments of the winding apparatus and the article being formed.

SUMMARY OF THE INVENTION

In accordance with the invention a valve having a reinforced valve body is produced by winding a resin-impregnated filament over a reusable mandrel which preferably is of two-part construction, and over a movable valve member which is supported on the mandrel in a predetermined coacting position with respect to a seal which also is supported on the mandrel. The temporary assembly is coated with a parting agent and when attached to a conventional filament winding apparatus is brought into selected relative positions with respect to the feed-eyes of that apparatus so that the filament is wound in layers upon the assembly. The method of winding includes a first stage of securing the seal and valve member in their coacting position and thereafter building of the valve body by winding layer upon layer and with the maximum thickness of layers being at the regions of the valve body which undergo the greatest stress in use.

When the valve body is built to its desired configuration the assembly is removed from the winding apparatus and the valve body is cured in an oven with the mandrel still in place. Thereafter, the assembly is dismantled by removing the mandrel from the cured valve body, and the valve body is subjected to conventional finishing operations to produce the final product.

Among the objects of the invention are the provision of an improved valve whose tensile strength is greater than conventional molded valves of the same size and materials; an improved valve which is corrosion resistant and of relatively light weight; an improved valve manufacturing process which dispenses with the use of expensive molds, and an improved process which permits the manufacture of different sized valves with the same filament winding apparatus.

The objects of the invention will become more apparent as the description proceeds and when considered in conjunction with the accompanying drawings in which.

Figure 1:
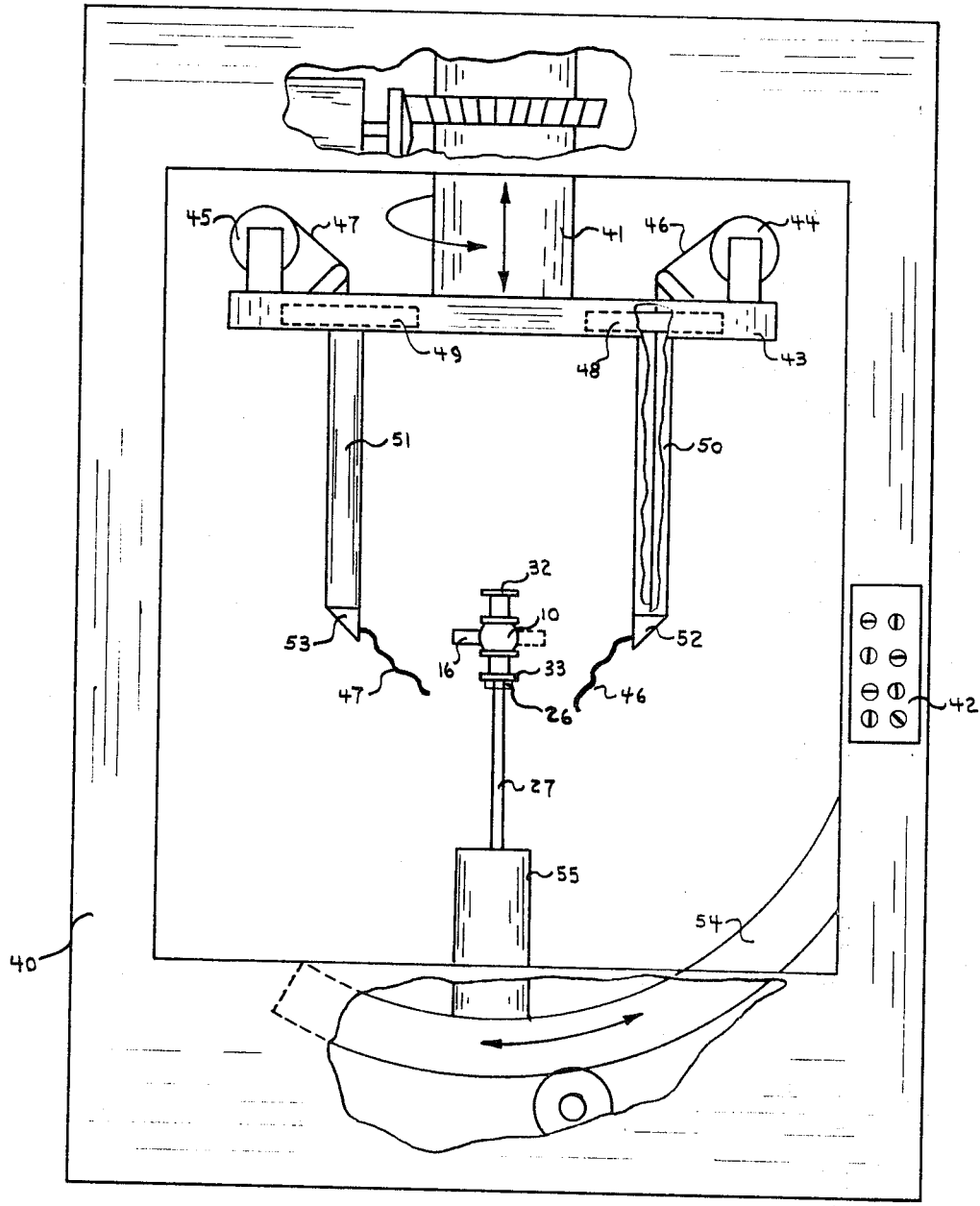
FIG. 1 is a diagrammatic view indicating the relative arrangement of a conventional filament winding apparatus and the temporary assembly of valve parts in preparation for carrying out the method of the present invention.
Figure 3:
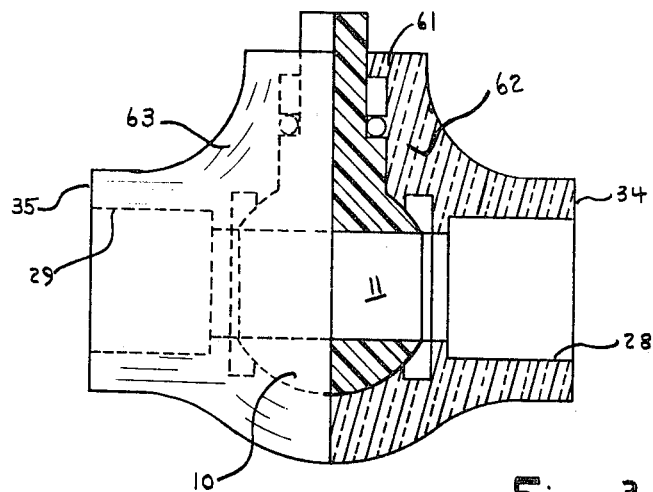

FIG. 3 is a partially cut away view of a finished valve made in accordance with the method of the invention, and FIGS. 4 to 9 are diagrammatic views indicating relative positions of the assembly and of the filament feed-eyes of the winding apparatus during representative stages of the fabrication of the valve, and with the axis of the assembly and the relative plane of the feed eyes being displaced from that seen in FIG. 1 for purposes of clarity of description.

Figure 2:
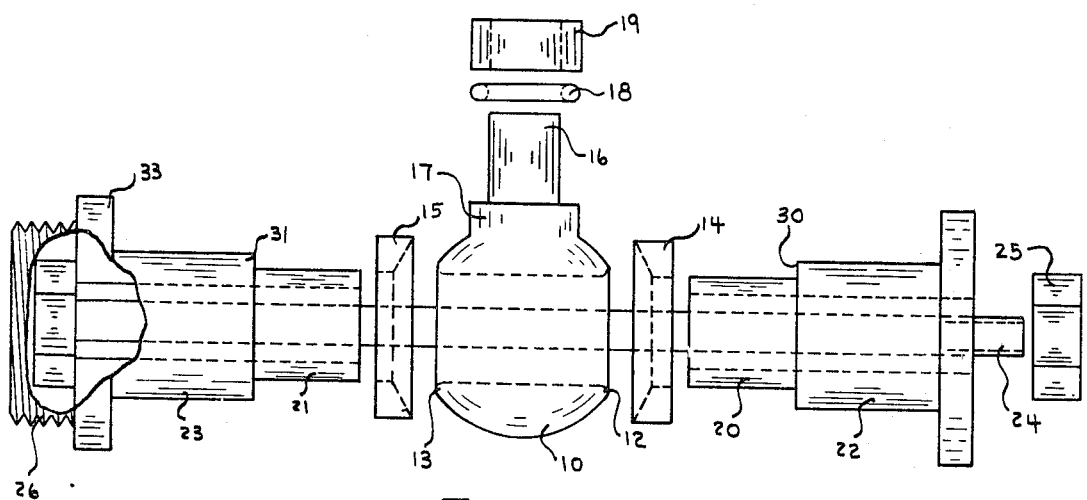
FIG. 2 is an exploded view showing the parts comprising the temporary assembly prior to being fastened together.

Referring first to FIG. 2, the invention is particularly well suited for the manufacture of ball type valves although in its broader aspects it is not necessarily limited to valves of this type. When so employed, a generally spherical ball 10, preferably of the type having an open valve, seal-pressure-reducing configuration, forms the movable valve member of the finished particle. This ball includes a flow passage 11 extending therethrough and terminating in ports which are surrounded by convex annular regions 12, 13 serving as seats for a pair of annular seals 14, 15. Means for moving the ball in the assembled valve may comprise a projection 16 which may be either rigidly or loosely connected to the ball and which includes a shoulder 17 against which an O-ring seal 18 may rest and be held in position by a collar 19.

As will later appear, this stem which projects generally laterally, from the valve body and which is to be substantially encased during the winding operation dictates the formation of crotch portions of the valve body and it is a feature of the invention that such crotch portions are reinforced by having a maximum thickness as compared with other portions of the valve body.

A two-part mandrel including first or inner tubular portions 20, 21 and second or outer tubular portions 22, 23 are adapted to be held in assembled position by a rod 24 having a threaded outer end upon which a nut 25 is removably attached. The other end of this rod is confined in a space within a conventional connector 26 attached to flange 33 and which connector is adapted to be detachably engaged with an elongated holder 27 forming part of the filament winding apparatus. The connector preferably is so constructed as to be turned through 180°, with respect to the position shown in FIG. 1, during certain stages of the winding operation and, if desired, may be motor driven. When a valve having socket portions 28, 29 for reception of pipe ends is desired, the outer diameters of the second portions of the mandrel are larger than the outer diameters of the inner portions thereof, the outer diameters of the first portions of such mandrel corresponding to the diameter of the flow passage 11 of the movable valve member. The junction of the first and second portions of the respective two-part mandrel elements form shoulders 30, 31 which define the socket ends, and flanges 32, 33 at the extreme outer ends of the second tubular portions provide limiting obstructions against which the filaments are placed during the winding operation and which in turn serve to define the end edges 34, 35 of the finished valve. The outer diameters of the first tubular portions of the mandrel, moreover, correspond to the inner diameters of seals 14, 15 and if desired a slight conical shape (not shown) may be employed on portions 20, 21 to insure that the seals are held snugly against the ball at the start of the winding operation.

Passing now to FIG. 1, a conventional filament winding apparatus, which forms no part of the present invention, includes a rigid framework 40 supporting a hydraulic cylinder 41 which is rotatable about its axis and translatable therealong by any suitable means controlled from a panel 42 at a convenient working station. Suspended from the lower end of this cylinder and attached thereto is a platform 43 on which a plurality of filament supply reels (two being shown at 44, 45) are rotatably mounted. In the broader aspects of the invention, the filament material may comprise glass fibre, metal, nylon, rayon or the like and which when treated and applied as herein described may provide for the finished article a tensile strength in the order of 100,000–140,000 p.s.i. The filaments 46, 47 upon leaving their reels pass through trays 48, 49 containing a suitable thermosetting impregnating material such as an epoxide resin, a polyester resin, or an acrylic compound, and thereafter are guided through depending housings 50, 51 to suitable feed-eyes 52, 53.

Cooperating with the above described apparatus and also controlled from panel 42 is an arcuate positioning arm or yoke 54 for supporting the temporary assembly of the above described mandrel and associated parts, and which arm has attached thereto a mount 55 for the elongated rod 27. Preferably the arm 54 has a range of movement of not less than about 135° and motion of arm 54 may be conducted either simultaneously with, or independently of, translating and/or rotating movement of the cylinder 41. The invention lends itself, moreover, to movement of the winding apparatus components in accordance with programmed instructions fed to the control panel by suitable conventional means such as timers, tapes or the like.

Figure 4:
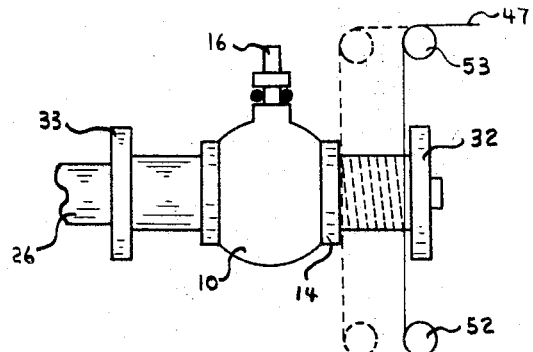
Figure 5:
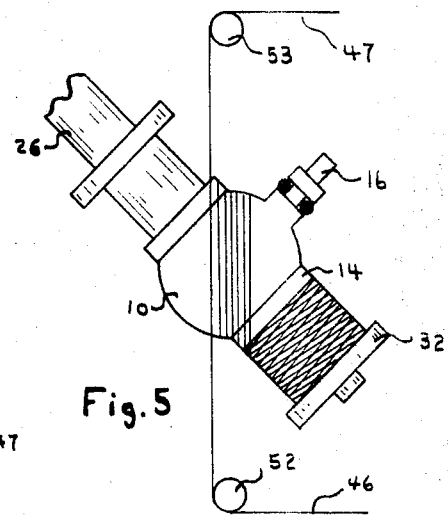

In carrying out the fabrication of a valve the temporary assembly of the mandrel and the described parts to be embedded in the valve body, as shown in FIG. 2, is first completed and thereafter the assembly is suitably coated with a parting or mold-release agent, such as silicone oil, Teflon, or other conventional material. As seen in FIG. 4 the ends of the resin-impregnated filaments 46, 47 are then attached to the surface of one of the outer tubular portions of the mandrel adjacent one of the flanges, here shown as flange 32, and the cylinder 41 is rotated with a slow translation downwardly, the positioning arm 54 meanwhile being stationary and with the adaptor 26 engaging the arm 27 so as to dispose the valve stem 16 in the solid line position of FIG. 1. As this occurs, the filaments, which may be under a slight tension, are laid side by side in a helical path over the coating material on that part of the temporary assembly between flange 32 and seal 14. Upon reaching the seal as indicated by the dotted position of the feed-eyes the filaments are then fed back toward the flange 32 by continuing rotation of the cylinder 41 but with a translation thereof upwardly. A reverse helical lay is thus obtained for the filament layer immediately above the original lay and at the same time a strong hoop type reinforcement results for the initial portion of the valve body being thus formed. The described operation is then continued until the space between the flange 32 and seal 14 is filled after which positioning arm 54 is actuated to bring the parts into their relative positions as seen in FIG. 5.

Figure 6:
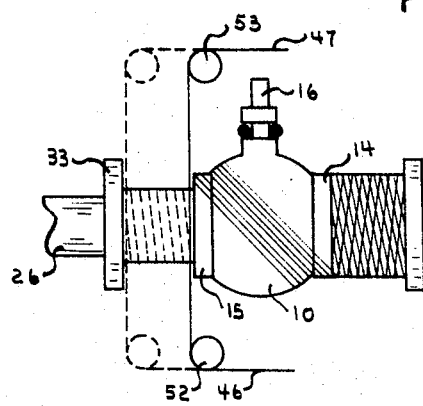

Upon shifting of the temporary assembly into this position, the cylinder 41 is then permitted to rotate in a lower plane with the result that filaments now are trained diagonally across the left hand side of the coated valve ball with a single lay after which the positioning arm 54 is restored to the position which it occupied at the start of the winding operation. As shown in FIG. 6, rotation of the cylinder 41 in a still lower plane is then carried out and the space between seal 15 and flange 33 is filled with the resin-impregnated filamentary material with layers helically wound in alternating direction. At the conclusion of the thus described steps, it will be noted that each of the seals 14 and 15 are secured in place with respect to the seats 12, 13 of the ball and that subsequent winding will not cause any relative shifting of such seals.

Figure 7:
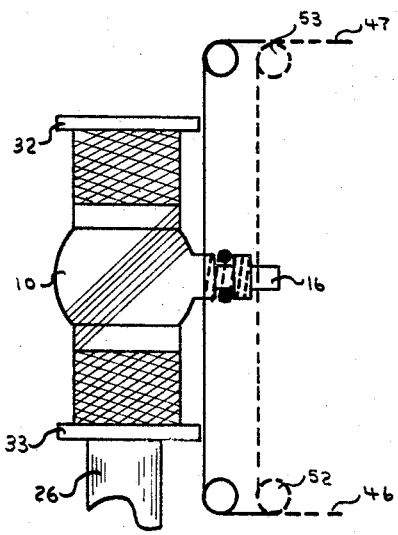

The positioning arm 54 is then actuated to bring the valve stem 16 of the assembly into the relative position seen in FIG. 7 and with rotation of cylinder 41 being carried out in a higher plane and beginning adjacent the junction of the stem and the ball. As this occurs the filaments cover the coated stem, O-ring seal, and collar, and the inner layer of the stem portion of the valve body is formed. During this step, the presence of collar 19 serves to hold the O-ring 18 in place against shoulder 17 of the stem 16 and to prevent the filament being laid from moving such O-ring out of its predetermined location.

Figure 8:
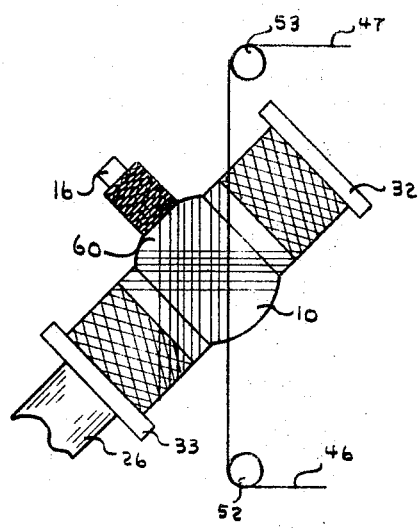
Figure 9:
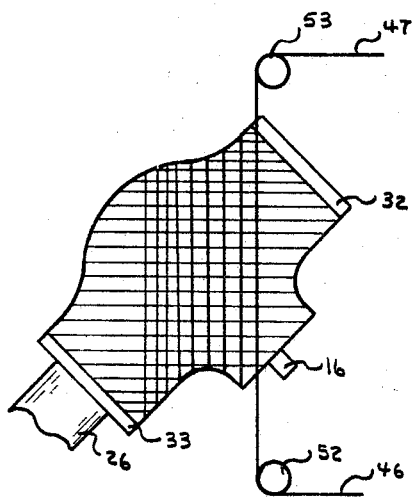

Having thus completed the initial phase of forming projecting portions of the valve body and which may be termed the seal-encasing stage of operation, various subsequent steps of winding operation may be performed by suitable relative adjustment of the positioning arm 54 so as to build the valve body to a desired configuration. As shown in FIG. 8, with the arm 54 retracted counterclockwise about 45° from the position seen in FIG. 1, rotation of cylinder 41 at appropriate planes of travel serves to wind filaments around the valve body from the flange 33 to the flange 32 so as to encase the entire ball 10. As will be understood, resin squeezed from the filaments will tend to settle in spaces temporarily formed during the winding, such as the triangular space 60 as seen in FIG. 8. If desired, space 60 and its companion space on the other side of the ball may be filled with separately applied patches of woven glass cloth impregnated with resin. As the valve body building operation continues, the arm 54 is periodically adjusted so as to bring the assembly repeatedly into selected positions corresponding to those seen in FIGS. 4, 5, 6, 7, and 8 and into other intermediate positions from which other helical angles of the winding will result. During this procedure the filaments also are extended across the outer surface of collar 19 as shown in FIG. 9 so as to build a wall portion 61, of the valve body outwardly of that collar. Relative adjustment of the connector 26 with respect to holder 27, or rotation of holder 27 with respect to mount 55, serves to place the assembly in position as seen in FIG. 9. As a feature of the finished valve, the crotch portions 62, 63 of the valve body, where stress would normally be concentrated during use, have a greater wall thickness than other portions of the valve body.

Following the operation of winding, the filaments are cut from the feed-eyes and the mandrel carrying the valve body and its encased parts is disconnected from the apparatus by detaching connector 26 from the holder 27. The detached article is then placed in a conventional temperature controlled curing oven, and the resin is cured and hardened. After a suitable time lapse the article is air cooled to handling temperature and the mandrel is removed by detaching nut 25 and by cutting away any filament material encasing the outer ends of the flanges 32, 33. Thereafter the ends of the valve body are squared with a conventional apparatus and the exterior surfaces of the valve body are sanded and wiped with a suitable finishing coating. The valve with this coating thereon is then cured in a suitable oven and upon removal from this final curing step constitutes the finished valve as best seen in FIG. 3.

As will now be apparent, the improved valve when prepared in accordance with the described method has a significantly higher bursting strength than molded plastic valves, is lightweight as compared with metal valves of like bursting strength, is corrosion resistant, and due to the self-contained seals is leak-proof. Due to the technique by which the valve is fabricated simple mandrel means which can be used repeatedly for valves of like size are employed with marked savings as compared with the molds required for molded valves. The same filament winding apparatus may be used for manufacture of a wide range of valve sizes merely by substituting one mandrel size for another at the point of connection with holder 27.

What is claimed is:

1. A valve comprising a reinforced valve body having a flow passage extending therethrough, a movable valve member disposed within said body, a seal disposed around said passage in contact with said member, and actuating means projecting laterally from the valve body and connected to said member for moving said member between open and closed positions, said valve body comprising a plurality of layers of a resin-impregnated filament wound around said valve member and said seal, and said valve body having a maximum thickness of said layers at the crotch portions of the valve body.

2. A valve as defined in claim 1 including an O-ring seal through which said actuating means projects, said O-ring seal being embedded within said valve body by the filament wound therearound.

3. A valve as defined in claim 2 wherein said O-ring seal is backed by a collar serving to prevent displacement of said O-ring seal during formation of said valve body and through which collar said actuating means projects, said O-ring seal and said collar being embedded within said valve body by the filament wound therearound.

4. A valve as defined in claim 1 wherein the surface of the flow passage in said valve body is formed by the innermost layer of filament.

5. A ball-type valve comprising a valve body having a flow passage extending therethrough, a generally spherical ball having a flow passage extending therethrough and terminating in ports at the circumference of the ball, a stem portion connected to said ball and projecting laterally of said valve body, and a pair of annular seals mounted within said valve body in contact with said ball and surrounding the interior junctions of the flow passage of said valve body with said ball, said valve body comprising a plurality of layers of a resin-impregnated filament wound around said ball and said seals and around the junction of said stem portion with said ball.

References Cited

UNITED STATES PATENTS 3,271,845   9/1966   Breher _____ 251—315 X

M. CARY NELSON, Primary Examiner

M. O. STURM, Assistant Examiner

U.S. Cl. X.R.

251—368